No. 619,230. Patented Feb. 7, 1899.
W. D. ROWLAND.
SHOVEL.
(Application filed Sept. 28, 1898.)
(No Model.)
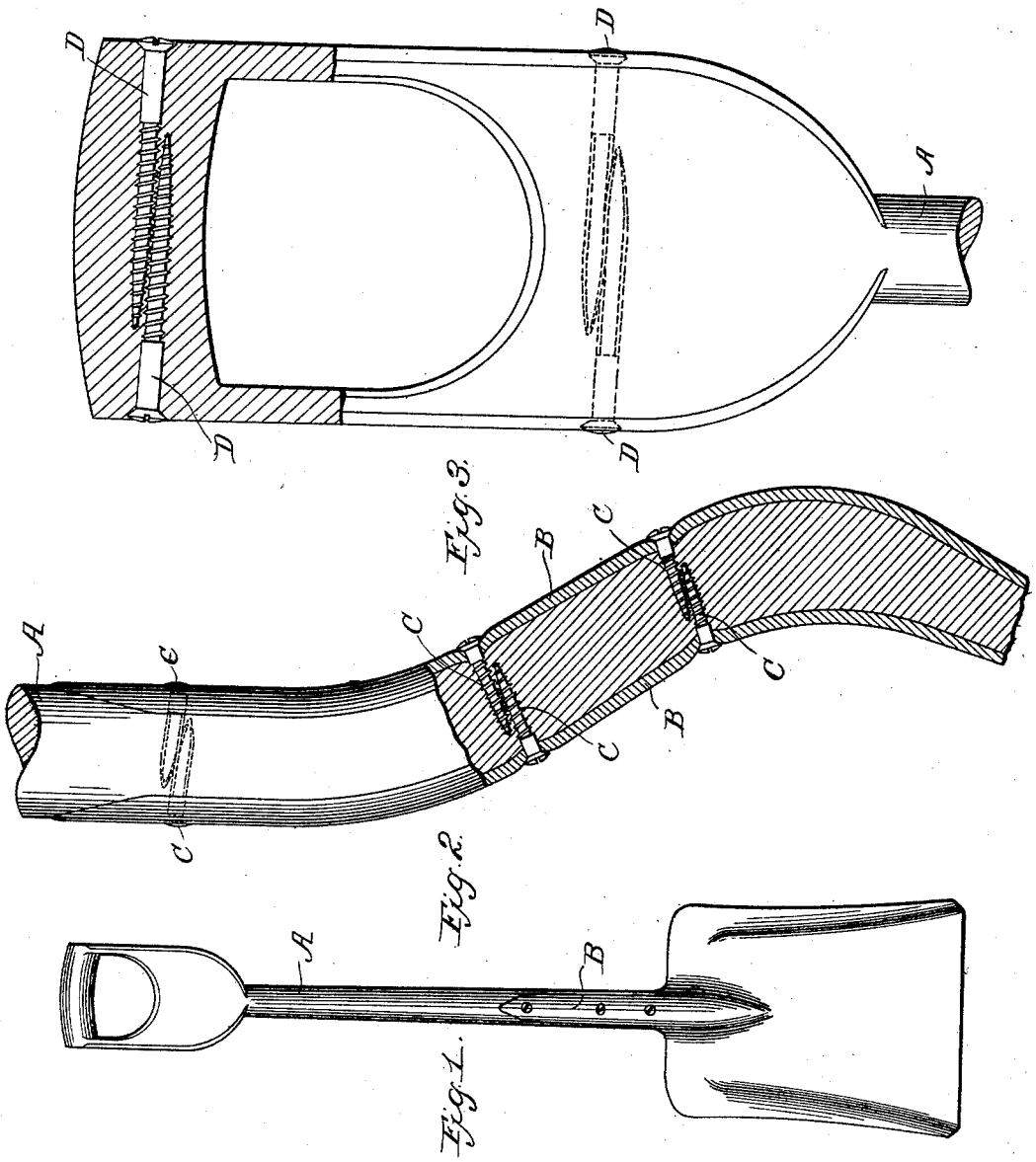
Witnesses
E. C. Wurdeman
Samuel Stuart
Inventor
William D. Rowland
by Geo. C. Hazelton Jr.
Attorney
THE NORRIS PETERS CO., PHOTO-LITHO., WASHINGTON, D. C.

UNITED STATES PATENT OFFICE.

WILLIAM DAY ROWLAND, OF PHILADELPHIA, PENNSYLVANIA.

SHOVEL.

SPECIFICATION forming part of Letters Patent No. 619,230, dated February 7, 1899.

Application filed September 28, 1898. Serial No. 692,081. (No model.)

*To all whom it may concern:*

Be it known that I, WILLIAM DAY ROWLAND, a citizen of the United States, residing at Philadelphia, in the county of Philadelphia and State of Pennsylvania, have invented a certain new and useful Improvement in Shovels, of which the following is a specification.

My invention relates to a new and useful improvement in shovels, and has for its objects to more securely fasten the handle of a shovel to the shank thereof and to strengthen the handle-block by a peculiar use of screws, thereby greatly facilitating the assembling of the shovel and entirely doing away with the use of rivets.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 represents a shovel of ordinary design embodying my improvement; Fig. 2, an enlarged view of a portion of the handle and shank, partly sectioned, showing the interlocking of the screws; and Fig. 3, a similar view of the handle-block.

In carrying out my invention as here embodied, A represents the handle of the shovel, and B the shank thereof, which is fitted to the curved portion of the handle in the usual manner.

Heretofore holes have been formed in the shank for the passage of the rivets, and these holes I still utilize; but instead of using rivets, which require accurate boring of the holes through the handle to register with the holes in the shank in order that the rivet may pass through both sides of the shank and the handle, each screw C has only to be started with a hammer or otherwise and then by the application of a brace screw-driver run into place, and when the screw from the opposite side is likewise run into place the threads of these two screws will interlock, as clearly shown in Fig. 2, thereby more securely holding the shank upon the handle than could be done by rivets, and this operation of the screws requires much less time and labor than where rivets are used, and, furthermore, in practice it often occurs that the rivets will draw through the shank on account of not being properly headed up, whereas with the screws the size of the head is predetermined and requires no hand labor. Another advantage is that should the handle shrink after being manufactured and stored, as is often the case, the screws may be again tightened, thus taking up any shake which has been occasioned by this shrinkage.

Heretofore it has been customary to pass two long rivets through the handle-block, one above and one below the eye, to prevent the splitting of this block from any cause, and the process was to first bore a hole entirely through the block, pass the rivet therethrough, place a bur or washer upon the opposite end, and head up this end; but a number of disadvantages have always been attendant upon this method, among which was the necessity of using skilled labor, and another was the invariable injury of a certain number of handles by chipping or splitting from a misblow of the riveting-hammer and likewise the straining of the handle by bending of the rivet during the process of heading, and still another was the fact that most handles would shrink after manufacture, leaving the ends of the rivets protruding beyond the edges of the handles upon which the hands of the user might be injured. I overcome these disadvantages by the use of screws D, which are run into the handle-block, as clearly shown in Fig. 3, their threads being caused to interlock, thereby as effectively preventing the splitting of the block as though rivets were used, while greatly reducing the hand labor thereon and permitting the use of unskilled instead of skilled labor, as heretofore. The usual holes may be bored for these screws, as by so doing less exertion will be required to turn them into place on account of their length.

In practice I have found that considerable saving in cost is effected by my improvement and that a much better shovel is produced.

Having thus fully described my invention, what I claim as new and useful is—

1. As a new article of manufacture, a shovel having its shank secured to the handle by screws passed from the opposite sides of the shank into the handle with their threads interlocking, as specified.

2. As a new article of manufacture, a shovel having its shank secured to the handle by screws passed through suitable holes in the shank and run into the handle with their threads interlocking, and its handle-block strengthened by screws passing from the opposite edges thereof their threads interlocking, as shown and described.

3. In a shovel, the combination of the shank, the handle fitted within said shank, screws passed through suitable holes in the shank from opposite sides thereof and threaded into the handle with their threads interlocking, a handle-block, and screws run into said block from the opposite edges thereof so as to cause their threads to interlock, as specified.

4. As an improved means of strengthening objects, overlapping screws, inserted therein from oposite directions and having their threads interlocking, substantially as described.

In testimony whereof I have hereunto affixed my signature in the presence of two subscribing witnesses.

WILLIAM DAY ROWLAND.

Witnesses:
WM. WRIGHT,
SAMUEL STUART.